F. COLBY.
PNEUMATIC TIRE.
APPLICATION FILED MAY 2, 1913.
1,276,875.
Patented Aug. 27, 1918.
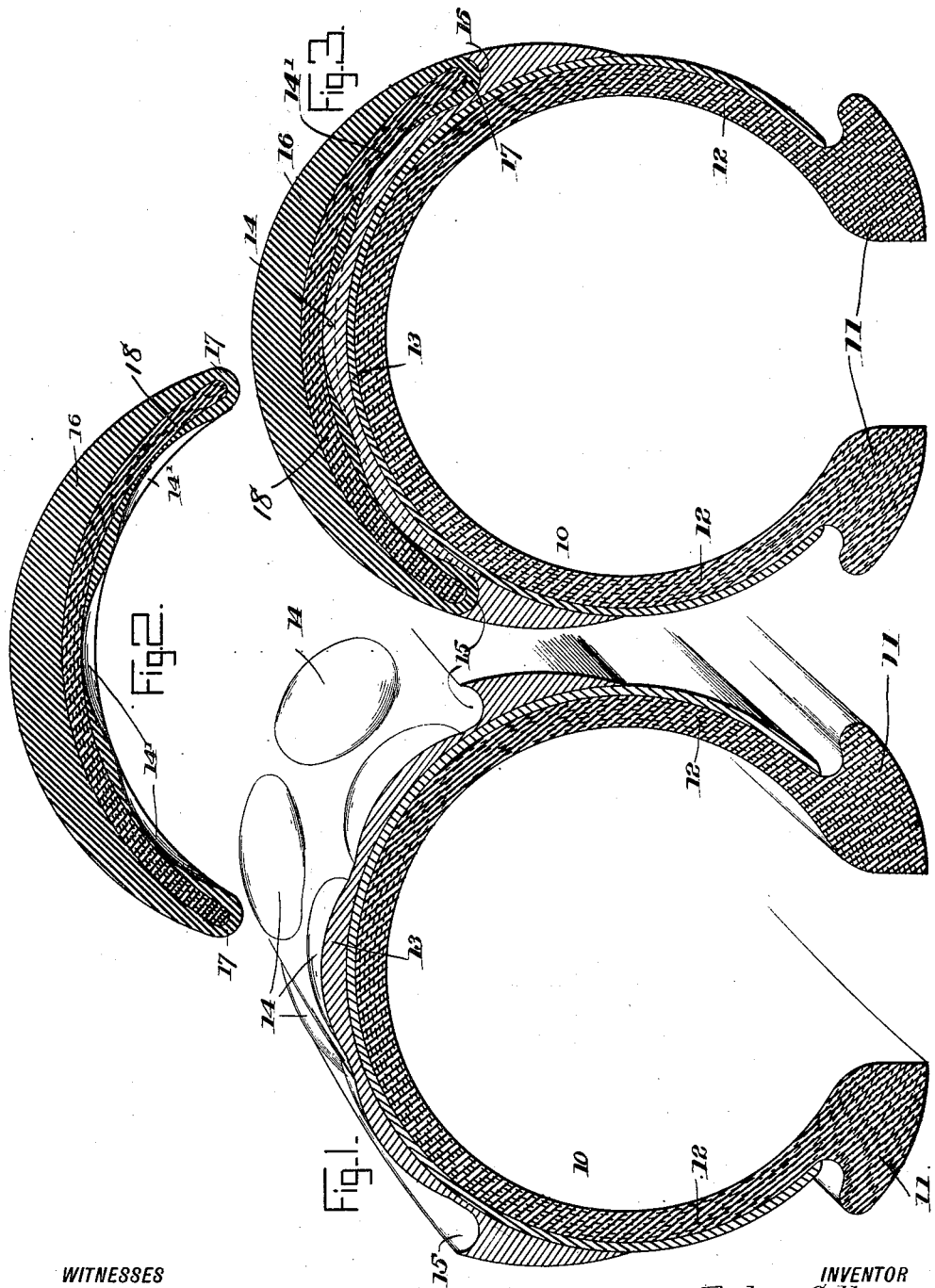
WITNESSES
INVENTOR
Fred Colby
BY
ATTORNEYS

UNITED STATES PATENT OFFICE.

FRED COLBY, OF TUXEDO PARK, NEW YORK.

PNEUMATIC TIRE.

1,276,875.  Specification of Letters Patent.  Patented Aug. 27, 1918.

Application filed May 2, 1913. Serial No. 765,024.

*To all whom it may concern:*

Be it known that I, FRED COLBY, a citizen of the United States, and a resident of Tuxedo Park, in the county of Orange and State of New York, have invented a new and Improved Pneumatic Tire, of which the following is a full, clear, and exact description.

This invention relates to resilient pneumatic tires for bicycles, motorcycles, automobiles or other vehicles, and has particular reference to a protecting armor for a pneumatic tire having the usual resilient qualities.

Among the objects of the invention, stated more definitely, is to provide a pneumatic tire of any well known or approved construction with respect to attaching or clenching means, such tire possessing the highest possible degree of resiliency and being provided with a removable or replaceable auxiliary tread member which receives the major portion of the wear, whereby when the tread becomes worn or damaged a new one may be substituted in its place at a comparatively slight cost and with the minimum delay as to time.

A further object of the invention is to provide a pneumatic tire of such a construction and nature as to be adapted for use in connection with a detachable auxiliary tread, such tire, however, being complete in itself and usable in the usual way either with or without the auxiliary tread.

The invention, furthermore, includes certain details of construction whereby the auxiliary tread is maintained in position by improved and simple means.

The foregoing and other objects of the invention will be hereinafter more fully described and claimed and illustrated in the drawings forming a part of this specification in which like characters of reference indicate corresponding parts in all the views, and in which—

Figure 1 is a sectional view in perspective of a pneumatic tire made in accordance with this invention;

Fig. 2 is a transverse section of the auxiliary tread; and

Fig. 3 is a similar view showing the main tire and the auxiliary tread assembled as they are intended to operate under normal conditions.

The several parts of this tire mechanism may be made of any suitable tough, strong, flexible materials, and the relative sizes and proportions of the structural features may be varied to a considerable extent without departing from the spirit of the invention hereinafter more fully set forth and specifically claimed.

As shown especially in Fig. 1, the main tire 10 is of a unitary or one piece construction and shown as provided with a well known or conventional form of clencher flanges 11. For the sake of flexibility the side portions 12 are comparatively thin, and at 13 is shown the tread portion of this part of the device. The tread 13 is preferably heavier and thicker than the side portions 12 and is adapted for practical use as a tire in the form shown in Fig. 1, especially for emergency purposes. The tread member 13 is rounded transversely as shown, having a plurality of convexities or lobes 14, which are preferably of spherical formation and extend in series circumferentially around the tire, similar series being located upon the respective rounded sides thereof. Upon the transverse circumferential arc of the main tire the tread member 19 may extend as far down the side portions 12 as may be desired, and in the form illustrated that portion terminates on either side in a similar groove 15.

At 16 is shown the auxiliary tread member, the same being concavo-convex in section and constituting an endless band or annulus snugly fitted to the periphery of the tread member 13 of the main tire. The member 16 is made of rubber or other elastic material and has a reinforcing concentric band 18 of pliable non-yielding material, such as the ordinary canvas fabric of the type commonly employed in the manufacture of tires of this class, but constructed of sufficient thickness and firmness to give to and maintain in the tread member the definite body form substantially as shown, and is made to extend substantially to the full width of the tread member 13 and is made preferably of uniform thickness in a continuous circumferential band of the width indicated. In practice I preferably wind the strips composing the webbing longitudinally of said tread member, whereby it is practicable to have a thinner webbing serve the purpose of thus holding the shape of the member. But on the other hand, when the webbing has been built up to sufficient depth to give the required form and rigidity to the member, and proper care is exercised to retain the desired form thereof, a bias winding of the usual type may be employed. Hence as the member 16 conforms to the curvature of the tread 13, the band of webbing 18 extends laterally along the rounded sides 12 and it will accordingly be seen is of relatively reduced diameter and circumferential length at the respective sides thereof, in comparison with the peripheral dimensions of the tread 13 of an inflated tire. The inner surface, therefore, of the auxiliary tread 16 is shaped complemental to the exterior surface of the tread 13; that is to say, being provided with concavities 14' corresponding in form, size and number to the convexities 14 above described. The webbing 18 also laterally rounded, as pointed out, parallels the inner surface of the member 16 immediately over the concavities 14' down to the edges 17 of the tread member. Thus, the annular webbing 18, when the tire is properly inflated, is adapted to hold the projections 14 into the corresponding retaining cavities 14' at the respective sides as well as upon the other portions of the periphery 13 of the main tire; and furthermore, the edges of the web 18 likewise act in the capacity of retaining the edges 17 into the grooves 15, and in return using the said grooves as a fulcrum, exert an increased locking pressure upon the cavities 14 of the member 16 in their respective positions over the corresponding raised portions 14.

The edges 17 of this tread member are adapted to extend into and remain seated in the grooves 15 aforesaid for the purpose above pointed out, and also that of excluding water, sand or other extraneous matter from working between the two portions of the device when in use. When the main tire is deflated, the auxiliary tread may easily be slipped in place, and when the tire is inflated in the usual way, the auxiliary tread will be rigidly secured in place and prevented by the convexities 14 from displacement either laterally or circumferentially. In other words, so far as the possibility of displacement of the auxiliary tread is concerned, the flanges forming the grooves on the sides 15 of the main tire may be omitted, although in practice I prefer to employ such flanges primarily for the purpose of preventing the entrance of sand or the like between the contacting surfaces of the two parts.

With the tire arranged as shown in Fig. 3, it is exceedingly strong and reliable because of the extra thickness of material at the particular place where the maximum strain and wear are brought. The main wear and tear being brought upon the auxiliary member, when one is damaged or worn out, a new auxiliary member may be put in its place at a very low cost compared with the usual cost of a first class pneumatic tire. It being a fact that a large majority of accidents to tires in practical use are due to blowouts, cuts or punctures occurring along the actual treads, I provide a means whereby a single tire may be used for an indefinite length of time, much longer than the usual life of a tire providing, of course, sufficient auxiliary treads are used in connection therewith for the purpose. I wish it understood, however, that the tire 10 may be regarded as a complete tire and usable as such without the auxiliary tread in the event of the disability of the auxiliary tread. In other words, if it should be that the tire 10 should lose its auxiliary tread while on the road, and another one is not available to take the place of the lost tread, the tire 10 under ordinary conditions would carry the vehicle to the end of its journey with a reasonable degree of safety.

I am aware that it has been proposed heretofore to employ auxiliary and renewable treads for pneumatic tires, but I believe it is new in my invention to provide a construction of the character set forth in which there is employed a complete tire usable as such, but having provision for the attachment of an auxiliary tread to provide for the usual wear and strain.

Having thus described my invention, I claim as new and desire to secure by Letters Patent:—

1. In a pneumatic tire having a transversely rounded periphery with spherical protuberances thereon and terminating in lateral annular grooves, a separable tread member having edges adapted to said grooves and concavities corresponding with said spherical protuberances; and retaining means comprising a relatively non-yielding circumferentially disposed band within said tread member adjacent said concavities and extending into the edges of said member.

2. In a pneumatic tire having a transversely rounded tread portion with annular grooves at the sides and a series of protuberances upon the rounded portion upon the periphery of said tread portion and at the sides thereof, a separable tread member having concavities for said protuberances and edges adapted to said grooves; and retaining means comprising a non-yielding flexible band extending from one edge to the other immediately adjacent said concavities, said protuberances and concavities coacting to lock the edges of said tread member in said grooves.

3. In a pneumatic tire having a transversely rounded tread portion with annular grooves at the sides and spherical protuberances upon the surface thereof, a separable tread member of resilient material having concavities corresponding to said protuberance and edges adapted to said grooves; and retaining means comprising a band of flexible, non-yielding material disposed within said member immediately over said concavities and extending into the edges thereof, said band having the circumferential portions within the edges of relatively reduced diameters.

In testimony whereof I have signed my name to this specification in the presence of two subscribing witnesses.

FRED COLBY.

Witnesses:
Geo. L. Beeler,
Philip D. Rollhaus.